United States Patent [19]
Drutchas

[11] 3,907,376
[45] Sept. 23, 1975

[54] DYNAMIC SKID CONTROL WITH THE TORQUE EQUILIBRIUM CONCEPT

[75] Inventor: Gilbert H. Drutchas, Birmingham, Mich.

[73] Assignee: TRW Inc., Cleveland, Ohio

[22] Filed: Feb. 8, 1973

[21] Appl. No.: 330,868

[52] U.S. Cl. ............ 303/21 BB; 303/10; 303/21 F; 303/68
[51] Int. Cl. ............................................. B60t 8/06
[58] Field of Search ............ 303/21 F, 21 B, 21 BB, 303/21 EB, 21 CH, 21 CG, 21 CF, 61–63, 68–69, 10; 188/181

[56] References Cited
UNITED STATES PATENTS

| | | | |
|---|---|---|---|
| 2,869,687 | 1/1959 | Keim et al. ........................ | 303/21 F |
| 2,937,051 | 5/1960 | Highley ............................ | 303/21 BB |
| 3,524,683 | 8/1970 | Stelzer ............................. | 303/21 F |
| 3,588,191 | 6/1971 | Atkin et al. ...................... | 303/21 F |
| 3,588,193 | 6/1971 | Drutchas ......................... | 303/21 F |
| 3,667,813 | 6/1972 | Burckhardt et al. ............. | 303/21 EB |
| 3,707,312 | 12/1972 | Drutchas et al. ................. | 303/21 F |
| 3,740,104 | 6/1973 | Wolff ............................... | 303/21 BB |

Primary Examiner—Trygve M. Blix
Assistant Examiner—D. C. Butler

[57] ABSTRACT

Overspeeding of the driving wheels on all $\mu$ surfaces is prevented by the addition of two valves to an existing skid control system: (1) a speed departure valve and (2) a brake lockout valve, so that the speed of the driving wheels can be controlled as a function of optimum road tire interface torque to prevent a side-to-side traction coupled with its outward token yaw. The speed departure valve is movable in response to difference in the rotational speeds of the driven and undriven wheels. Also, the brake lockout valve is moveable upon movement of a speed departure valve element in response to overspeeding of the driven wheels to apply a braking force to the brake motors of the driven wheels.

7 Claims, 1 Drawing Figure

US Patent   Sept. 23, 1975   3,907,376
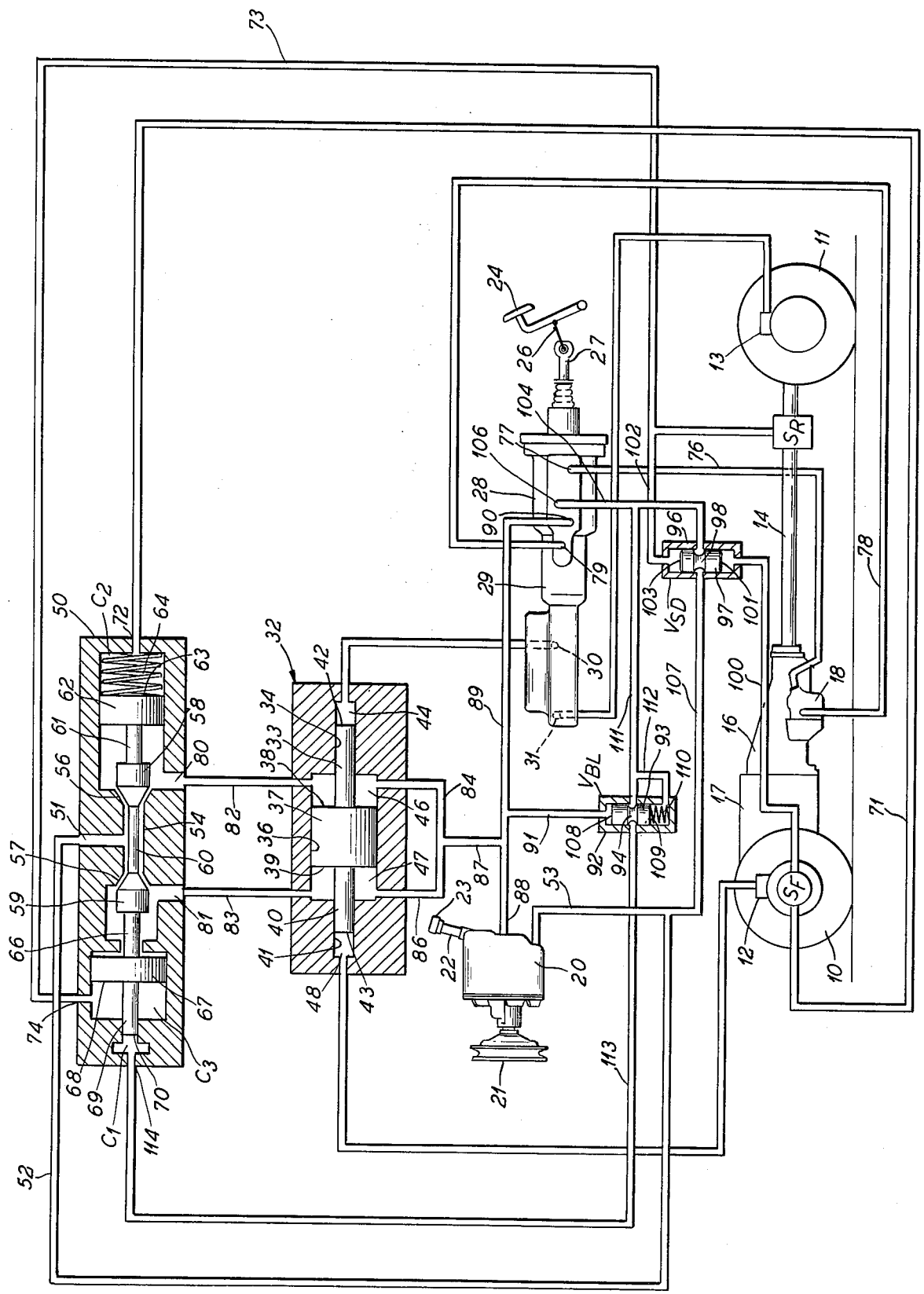

DYNAMIC SKID CONTROL WITH THE TORQUE EQUILIBRIUM CONCEPT

BACKGROUND OF THE INVENTION

1. Field of the Invention

This invention relates generally to wheeled vehicles and more particularly to a braking system for such a vehicle with skid control.

2. The Prior Art

The prior art is represented by U.S. Pat. Nos. 3,588,193 and 3,707,312. The first patent discloses a method and means of skid control in a wheeled vehicle based on an operational principle of extremal control. However, during vehicle operation, when a combination of side-to-side surface unbalance coincides with an accelerating drive wheel condition, a tendency towards yaw is noted. The driver normally corrects for this condition by easing off the engine throttle. The second patent discloses a dynamic proportioning means for varying the braking effort applied to front and rear wheels.

SUMMARY OF THE PRESENT INVENTION

In accordance with the principles of the present invention, it is contemplated that two valves be added to a skid control system, whether that system be of the full power type or whether of any other kind of skid control arrangement heretofore provided. In any event, there is added to the skid control system two valves, (1) a speed departure valve and (2) a brake lockout valve. The speed departure valve is supplied with a signal corresponding to the respective speeds of the driven wheels and the undriven wheels. Accordingly, whenever it is actuated in response to a difference in the rotational speed of the two sets of wheels, the brake lockout valve is actuated whereupon the driving wheel speed can be controlled as a function of optimum road tire interface torque to prevent a side-to-side traction coupled with its outward token yaw.

BRIEF DESCRIPTION OF THE DRAWINGS

The single FIGURE of the drawing is a somewhat schematic plumbing diagram and illustrates general constructional features of the pump and valve combinations contemplated by the dynamic skid control with the torque equilibrium concept of the present invention.

DESCRIPTION OF THE PREFERRED EMBODIMENTS

The basic operational principle of the skid control system disclosed herein is similar to that disclosed and claimed in U.S. Pat. No. 3,588,193 in that the operational principle is one of extremal control, reaching a near torque equilibrium between brake torque and surface torque at the maximum (extremal) value of surface torque. Thus, the system of the present invention constantly seeks the peak of the $\mu$ (coefficient of friction)-slip curve by modulating pressure towards critical slip. By utilizing this control from surface torque, significant advantages compared to mere slip control are afforded. For example, an immediate response to the key initial conditions of a stop-road surface condition is effected. There is also inherent system response to major conditions such as vehicle load distribution, vehicle tire conditions and degraded brakes. Such conditions are variables that manifest themselves in the development of the torque which the system tends to put in equilibrium. There is no need with the present system to input vehicle speed to the control system since torque is the essential system input. Further, there is no need to input the shape and magnitude of the tire-road coefficient of friction versus slip curve. There is full time component operation during normal braking which enhances system readiness confidence level when a panic stop mode arises. The amplitude of the pressure cycling, when it occurs, is such that there are no effects perceptible to the operator.

The concepts described herewith also utilize structural elements that are normally part of an existing skid control system, for example, as disclosed and claimed in U.S. Pat. No. 3,707,312 relating to a four wheel skid control system with dynamic proportioning.

As shown in the drawings, the exemplary disclosure set forth in detail herein constitutes a wheeled vehicle having a first set of wheels 10 which can constitute the front wheels of a vehicle but which in any event are undriven wheels. It will be understood that in vehicles having front wheel drive the respective locations of the wheels could be reversed. A second set of wheels is shown at 11 and constitutes in this particular vehicle the rear wheels.

Each wheel of the respective sets of wheels is provided with its own brake motor. Thus, the front wheel 10 has a brake motor 12 and the rear wheel 11 has a brake motor 13. It will be understood that the brake motors 12 and 13 can constitute either disk brakes or drum brakes, whatever is suitable as a matter of engineering choice. It is also contemplated that there be provided a hydraulic sensor constituting a front wheel sensor $S_f$ and a rear wheel sensor $S_r$. In this instance, the hydraulic sensor $S_f$ is directly driven by the front wheels while the rear wheel sensor $S_r$ is driven by a propeller shaft shown at 14. The propeller shaft extends between a transmission housing 16 located at the rear of an engine 17. The vehicle is also provided with a skid control pump shown at 18 and which is rotatably driven at a rotational speed corresponding to the wheel speed of the vehicle. This is accomplished by driving the pump 18 off of the propeller shaft 14. Those experienced in the art will recognize that my invention is not limited to employing hydraulic rotating pump sensors. Electronic, mechanical, or other suitable sense means may be employed.

Another pump is provided in accordance with the principles of the present invention which is shown generally at 20 and which is driven independently of the wheel speed of the vehicle. Such pump may conveniently comprise the power steering pump of the vehicle rotatably driven by a pulley 21 with which a pulley belt may be associated such as a fan belt drive. The power steering pump 20 has a filling tube 22 closed by a cap 23, thereby permitting the system to be filled with power steering fluid.

An operator-actuated brake pedal is shown at 24 and is drivingly connected as at 26 to a plunger 27 forming part of a full power system unit 28 including a master cylinder 29 having a front master cylinder unit 30 and a rear master cylinder unit 31.

There is shown generally at 32 a so-called up and down valve having a piston 33 which moves in a cylinder 34.

Interiorly of the up and down valve 32 there is an enlarged cylinder 36 in which moves a correspondingly enlarged piston 37 having a motive surface 38 on one side and a motive surface 39 on the opposite side.

A reduced size piston 40 corresponding in size to the piston 33 moves within a cylinder 41. It will be understood that the end faces 42 and 43 on the pistons 33 and 40 are substantially the same size.

There is thus formed in the up and down valve a cavity 44 of which the surface 42 constitutes one wall, a cavity 46 of which the wall 38 forms one wall, a cavity 47 of which the end surface 39 forms one wall and a cavity 48 of which the surface 43 comprises one wall.

A dynamic proportioning valve is shown generally at 50. The dynamic proportioning valve has a centrally disposed passage 51 connected to a conduit 52 leading to a discharge conduit 53 connected to the power steering pump 20. The passage 51 intersects a divider passage 54 having a first valve seat 56 and a second valve seat 57 formed therein and cooperable with corresponding valve heads 58 and 59 respectively. The valve heads 58 and 59 are located on opposite ends of a plunger 60.

The plunger 60 has an extension 61 extending to the right from the valve head 58 and on the end thereof is an enlarged piston 62 having a motive surface 63 forming one wall of a cavity $C_2$. A coil spring 64 is located in the cavity $C_2$ and provides a continuous biasing force loading the valve element in one direction.

The plunger 60 has a further extension 66 extending to the left of the valve head 59 to which is connected a piston 67. The piston 67 has a motive surface 68 forming one wall of a cavity $C_3$. Projecting leftwardly from the piston 67 is a reduced diameter spool 69 having an end face 70 which forms one wall of a cavity $C_1$. It will be noted that the piston 67 is of somewhat larger diameter than the piston 62, namely, in an amount to offset the loss of area present in the shaft spool end 69. Thus, when the same pressure is present in both cavities $C_2$ and $C_3$, it will be understood that the effective areas of the motive surfaces 63 and 68 will be the same.

It will be noted that the front sensor or the sensor on the undriven wheels $S_f$ is connected by a conduit 71 to the dynamic proportioning valve 50 as at 72, thereby communicating a hydraulic pressure signal to the cavity $C_2$.

The rear wheel sensor or the sensor to the driven wheels $S_r$ is connected by a conduit 73 to the dynamic proportioning valve 50 as at 74, thereby conducting a hydraulic pressure signal to the cavity $C_3$.

The skid control pump 18 has a first line 76 connected between the full power system 28 as at 77 and a second line 78 is connected to the full power system 28 as shown at 79.

The cross passage 54 controlled by the respective valve heads 58 and 59 leads to two separate openings 80 and 81 in the proportioning valve 50 and from thence via passages 82 and 83 to the up and down valve 32, the passage 82 being connected to the cavity 46 and the passage 83 being connected to the cavity 47.

A passage 84 and a passage 86 leads from the up and down valve back to a common passage 87 connected to the power steering pump as at 88. A branch connection 89 leads to the full power system 28 as at 90 and a branch 91 is connected to a brake lockout valve $V_{bl}$.

The brake lockout valve $V_{bl}$ has a housing 92 in which moves a spool 93 formed with a valving annulus 94.

A second valve is shown at $V_{sd}$, namely, the speed departure valve which has a housing 96 in which moves a spool 97 formed with an annulus 98.

The sensor $S_f$ has a line 100 connected to one end of the housing 96, thereby to load a surface 101 formed on the spool 97.

The sensor $S_r$ supplies a corresponding hydraulic signal via the line 102 to the other end of the housing 96 thereby to load the opposite surface 103 of the spool 97.

The annulus 98 controls the flow of fluid through a line 104 connected to the full power system 28 as at 106 and also a line 107 leaving out of the opposite side to connect with the line 53 and the line 52 to the power steering pump 20.

The spool in the brake lockout valve $V_{b1}$ has a first end surface 108 and a second surface 109. A coil spring 110 provides a continuous loading bias against the surface 109. A hydraulic line 111 has a branch 112 connected to the brake lockout valve opposite the surface 109. The other side of the annulus 94 leads to a line 113 connected to the proportioning valve 50 as at 114 and communicates with the cavity $C_1$.

In a first mode of operation where the driven and undriven wheels are moving at a fixed velocity and at the same wheel speed, the two hydraulic sensors $S_f$ and $S_r$ will present the same pressure signal to the speed departure valve $V_{sd}$ through its fore and aft surfaces 101 and 103. Accordingly, the spool 97 will be placed in equilibrium and no control action will occur.

If during vehicle operation, when a combination of side-to-side surface unbalance coincides with an accelerating drive wheel condition, a tendency toward yaw is noted and the driving wheel speed may vary from the speed of the undriven wheels through acceleration. Under such conditions, the pressure acting on the surface 103 of the valve spool 97 will be greater than the pressure acting on the surface 101 and as a consequence, the speed departure valve spool 97 will move tending to close the annulus 98. Accordingly, the pressure path from the full power system unit 28 flows through the line 104, through the line 111 and through the annulus 94. The brake lockout valve $V_{bl}$ remains open, due to the equal pressures acting on the surfaces 108 and 109. Since the annulus 94 is open, pressure passes beyond the brake lockout valve $V_{bl}$ into the line 113 to the cavity $C_1$ and acts on the end of the spool 70 of the spool 69, forcing the spool 60 to the right. When the valve element moves, the flow line 83 is blocked, which releases the brakes on the undriven wheels by forcing the up and down valve piston 37 to the right. Thus, the brakes to the driven wheels are automatically applied. As disclosed in greater detail in the acknowledged prior art patents, the rear brakes will be automatically applied through the skid control pump action directed into the rear wheels or the driven wheels above the governor shift valve shift ranges of approximately 3 to 7 miles per hour through the blockage of the throttle valve in the full power system unit 28.

The addition of the valves $V_{sd}$ and $V_{bl}$ affords control of the overspeeding of the driving wheels by automatically braking the driving wheels at critical phases in the vehicle's operation when an impending skid is sensed.

The operation of the present system during braking is as follows. In a braking condition as when the full power system throttle closes off, when a force is applied on the push rod 27, there is no pressure in the line 104 downstream of the full power system throttle. The line 88 undergoing the pressure developed by the power steering pump 20 acts on the brake lockout valve $V_{bl}$ by acting against the surface 108 through the branch passage 91. The opposite surface 109 is at the pressure level of the line 104, virtually atmospheric. Accordingly, the brake lockout valve $V_{bl}$ closes the annulus 94, thereby assuring that leakage across the throttle will not affect the pressure level in the cavity $C_1$. Thus, the braking skid control pattern will remain the same as disclosed in the prior acknowledged patent wherein braking forces proportion between the front and rear wheels by the up and down valve 32 and the dynamic proportioning valve 50.

It will be evident to those versed in the art that the disclosure of the present invention is a viable means of securing a "no-slip mechanism" for providing traction from a zero speed start on slippery surfaces. Since the speed difference valve $V_{sd}$ automatically biases when the front wheels are at zero speed and the rear wheels are overspeeding, the present invention has the capability of replacing a so-called limited slip differential which relies on locking both wheel axles to each other below a predetermined torque bias.

Although minor modifications might be suggested by those versed in the art, it should be understood that I wish to embody within the scope of the patent warranted hereon all such modifications as reasonably and properly come within the scope of my contribution to the art.

I claim as my invention:

1. In a vehicular skid control system,
   a first sensor and a second sensor to sense the rotational speed of the driven and the undriven wheels of the vehicle,
   a speed departure valve operatively connected to said sensors and having a first valve element movable in response to differences in the rotational speed of the driven and undriven wheels,
   and a brake lockout valve controlling a second valve element normally positioned in an equilibrium position, but movable upon movement of the speed departure valve element in response to overspeeding of the driven wheels to apply a braking force to brake motor means of said driven wheels,
   whereupon the speed of the driven wheels is controlled as a function of optimum road tire interface torque.

2. In a vehicular braking and skid control system,
   a first set of wheels which are undriven and having brake motor means and having a first hydraulic sensor for developing a first sensing signal corresponding to the rotational speed of the undriven wheels,
   a second set of wheels which are driven having brake motor means and having a second hydraulic sensor for developing a second sensing signal corresponding to the rotational speed of the driven wheels,
   hydraulic circuit means for selectively transmitting braking forces to said brake motor means,
   and means for controlling the speed of the driving wheel comprising,
   a speed departure valve comprising a movable spool having a control annulus in said hydraulic circuit means and having motive surfaces on opposite sides thereof receiving the signals from said hydraulic sensors,
   the speed departure valve annulus being closed by said signals upon overspeeding of the driven wheels and the closing of the annulus interrupting part of the hydraulic circuit means to apply braking forces to said driven wheels,
   whereupon the speed of the driven wheels is controlled as a function of optimum road tire interface torque.

3. In a vehicular braking and skid control system,
   a first set of wheels which are undriven and having brake motor means and having a first hydraulic sensor for developing a first sensing signal corresponding to the rotational speed of the undriven wheels,
   a second set of wheels which are driven having brake motor means and having a second hydraulic sensor for developing a second sensing signal corresponding to the rotational speed of the driven wheels,
   hydraulic circuit means for selectively transmitting braking forces to said brake motor means on the driven and undriven wheels,
   and means for controlling the speed of the driving wheels comprising,
   a speed departure valve comprising a movable spool having a control annulus in said hydraulic circuit means and having a mode of surfaces on opposite sides thereof receiving the signals from said hydraulic sensors to correspondingly adjust the operation of the hydraulic circuit means,
   and a brake lockout valve in said hydraulic circuit means operable to lock out the actuation of the brake motor means on the undriven set of wheels whenever the speed departure valve is actuated,
   thereby automatically braking the driven wheels at critical phases in the vehicle's operation when an impending skid is sensed.

4. A vehicular skid control and power braking system comprising,
   a skid control pump driven as a function of rotational wheel speed of the vehicle,
   a power steering pump driven independently of the vehicle wheel speed,
   a full power system unit receiving the output of said pumps and including hydraulic circuit means to selectively utilize the dynamically pressurized fluid so furnished for braking purposes,
   said full power system comprising an operator-actuated master cylinder having first and second master cylinder portions,
   an up and down valve having a piston actuated by the pressure developed in the first master cylinder portion and transmitting pressure therethrough,
   a first brake motor means for a set of undriven wheels and receiving pressure from said first master cylinder portion,
   a second brake motor means for a set of driven wheels receiving pressure from said second master cylinder portion,
   said up and down valve having piston and cylinder means receiving the dynamically pressurized fluid from the power steering pump,
   a proportioning valve connected in series with said up and down valve,
   a first hydraulic sensor for developing a first sensing signal corresponding to the speed of the undriven wheels of the vehicle, a second hydraulic sensor for developing a second sensing signal corresponding to the speed of the driven wheels of the vehicle, said proportioning valve receiving signals from both of said sensors to proportion the braking force applied to the driven and undriven wheels of the vehicle, and a pair of additional valves to control the speed of the driving wheels as a function of the optimal road tire interface torque, comprising,
1. a speed departure valve having a spool acted on by said first and second sensing signals, and
2. a brake lockout valve actuated whenever said speed departure valve is operated in response to differences in the rotational speed of the wheels, said proportioning valve having a spool and acted on by pressure passing through said brake lockout valve, thereby moving the proportioning valve to lock out the up and down valve and release the undriven wheels.

5. A skid controller for a vehicle having two sets of wheels including front wheels and rear wheels each having their own brake motors and comprising, a means for measuring rear wheel speed,
a means for measuring front wheel speed,
an external power means for supplying pressure to separate front and rear brake actuating motors,
and dynamic pressure control means responsive to differences in front and rear wheel speeds, thereby to apply more or less pressure to the front brake actuating motors to maintain an optimum relationship of front-to-rear wheel slip, one set of said wheels being driven wheels and the other being undriven wheels, and a pair of additional valves to control the speed of the driven wheels as a function of the optimal road tire interface torque, comprising,
1. a speed departure valve responsive to differences in the rotational speed of the wheels and
2. a brake lock-out valve actuated whenever said speed departure valve is operated,
said dynamic pressure control means including means regulated by said brake lock-out valve to release the undriven wheels.

6. An hydraulic power brake system with skid control comprising, separate front and rear braking motors for a wheeled vehicle,
a skid control pump rotational as a function of the rotational speed of the rear wheels,
a second pump operable as a power source,
a master cylinder booster for actuation by the vehicle operator when braking is desired,
a front wheel sensor rotatable as a function of the rotational speed of the front wheels,
a rear wheel sensor rotatable as a function of the rotational speed of the rear wheels,
one set of said wheels being driven wheels and the other being undriven wheels
and a dynamic proportioning means for maintaining a relationship in front-to-rear wheel slip comprising, and up-down valve having a differential area piston formed with a first set of smaller piston areas and a second set of larger piston areas, means for applying master cylinder static pressure to one of said smaller piston areas whereby the other of said smaller piston areas will transmit corresponding pressure to the front wheel braking motors, means for transmitting pressure from said power source to said larger piston areas, a slip control valve comprising a spool having a pair of spool sections which when open will vent a corresponding one of said larger piston areas to drain so no pressure registers thereon, and means for applying a signal generated by said skid control pump to one end of said spool and for applying a signal generated by said front wheel sensor to the other end of said spool, whereby the net signal operating on said spool will position the spool to raise and lower the dynamic pressure loading of said differential area piston, and a pair of additional valves to control the speed of the driven wheels, comprising,
1. a speed departure valve responsive to differences in the speeds of the front and rear wheels, and
2. a brake lock-out valve actuated whenever said speed departure valve is operated,
said slip control valve having a spool and acted on by pressure passing through said brake lock-out valve, thereby moving the slip control valve to lock out the up and down valve and release the undriven wheels so that the speed of the driven wheels will be controlled as a function of the optimal road tire interface torque.

7. For use in a wheeled vehicle skid controller, a dynamic proportioning valve having means for dynamically proportioning pressure to the front and rear braking motors of the wheeled vehicle, operator actuated means for supplying operator generated pressure to said valve, means for applying a rear wheel generated pressure signal to said valve, and means for applying a front wheel generated signal to said valve, whereby said valve will maintain an optimum relationship of front-to-rear wheel slip, and a pair of additional valves to control the speed of the rear wheels as a function of the optimal road tire interface torque, comprising,
1. a speed departure valve having a spool acted upon in response to differences in the speeds of the front and rear wheels, and
2. a brake lock-out valve actuated whenever said speed departure valve is operated,
said dynamic proportioning valve being regulated by said brake lock-out valve to release the front wheels whenever said brake lock-out valve is actuated.

* * * * *